Aug. 17, 1943.   B. BARÉNYI ET AL   2,326,918
VEHICLE RUNNING GEAR
Filed June 7, 1941
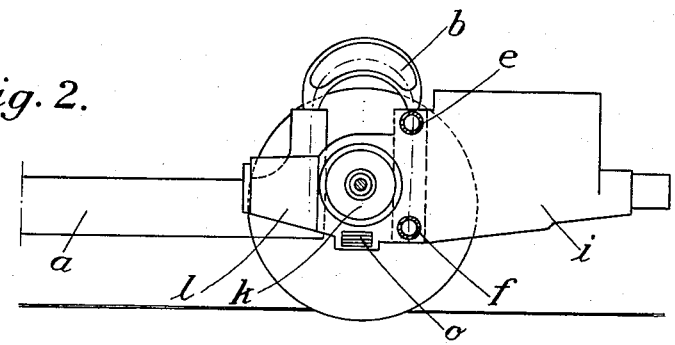
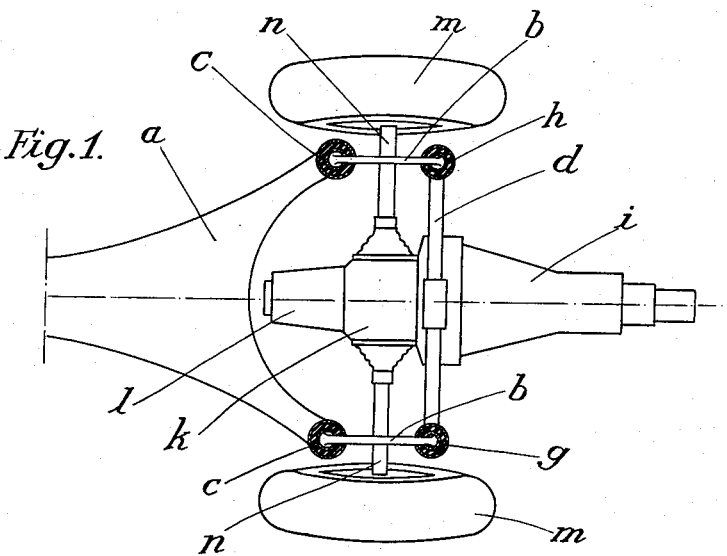
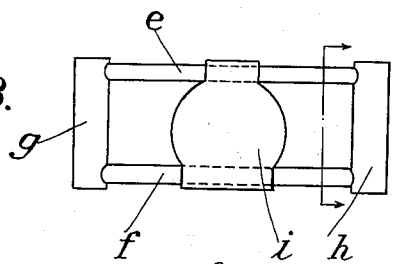
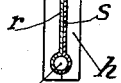
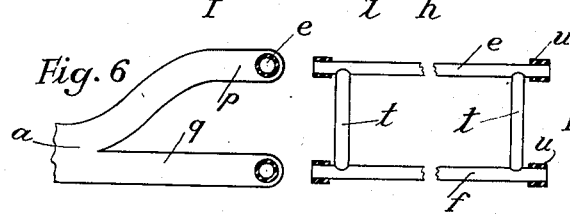
INVENTORS:
BELA BARENYI
KARL WILFERT
ATTORNEYS Patented Aug. 17, 1943

2,326,918

UNITED STATES PATENT OFFICE 2,326,918

VEHICLE RUNNING GEAR

Béla Barényi, Vaihingen-Rohr a. d. F., and Karl Wilfert, Sindelfingen, Germany; vested in the Alien Property Custodian Application June 7, 1941, Serial No. 397,008
In Germany April 26, 1940

16 Claims. (Cl. 180—64)

The present invention relates to a supporting member for resiliently connecting the axle or driving aggregate to the rest of the vehicle.

Axle and driving aggregates respectively have already been proposed which are resiliently connected to the rest of the vehicle. To suitably and resiliently connect the axle or driving aggregate respectively to the rest of the vehicle special supporting members also have been proposed at which are arranged the elements serving to connect the supporting member to the rest of the vehicle.

The present invention relates to a particular suitable construction of such a supporting member which is adapted to transfer large forces from the axle, viz., driving aggregate (axle-aggregate or axle aggregate and change gear or axle aggregate and change gear and motor) upon the rest of the vehicle or in a reversed direction. Such a supporting member may also be used with special advantage for such axle or driving aggregates which with regard to the rest of the vehicle have a particular large resiliency for instance transversely to the direction of drive.

The invention mainly consists in constructing the supporting member substantially as a preferably twist-stiff frame arranged in a substantially vertical transverse plane and comprising hollow beams or sheet metals having for instance hollow stiffening members. A particular stiffness results, if the hollow supports or the hollow stiffening members form a closed hollow ring. The ends of the transversely arranged hollow supports or the vertical hollow supports connecting the hollow stiffening members may in a suitable manner be formed as tube-like lateral bearings, preferably joint bearings for resiliently connecting the supporting member to the rest of the vehicle.

In the accompanying drawing the invention is diagrammatically shown by way of example.

In this drawing:

Fig. 1 shows the plan view of the rear end of a vehicle frame,

Fig. 2 is a side elevation of the frame shown in Fig. 1,

Fig. 3 is a rear elevation of the supporting member,

Fig. 4 is a vertical section through a modified form of supporting member, and

Figs. 5 and 6 illustrate further modified constructions.

By means of two substantially U-shaped links which may swing in a horizontal plane and are resiliently mounted—preferably by means of distortion stressed rubber-rings $c$—at the rear forked ends of the frame $a$, a supporting member $d$ is connected to the forked ends of the frame $a$ in a manner capable of swinging in the transverse direction. The supporting member $d$ consists of the horizontal transverse tubes $e$ and $f$ the ends of which are connected to each other by vertical tubes $g$ and $h$. The latter serve as joint bearings to connect the supporting member $d$ to the links $b$.

Rigidly connected to the supporting member is the driving aggregate, consisting of the motor $i$, the axle gear $k$ and the change speed gear $l$. The rear wheels $m$ are mounted upon half axles $n$ which are capable of swinging and are hinged to the axle gear $k$. To absorb shocks acting upon the half axles $n$ adapted to swing, a transverse blade spring $o$ is provided which for instance is fixed to the axle gear below the latter.

Instead of the supporting member for the axle aggregate formed of the tubes $e$, $f$, $g$, $h$, a shield-like supporting member twist-stiff in itself could eventually be used which for instance may consist of one or several sheet irons welded together and arranged in a vertical transverse plane as shown in Fig. 4. By providing bulgings in the sheet irons in this case also the supporting member may be provided with hollow stiffening members which eventually may be arranged in form of a hollow ring corresponding about to the tubes $e$, $f$, $g$, $h$.

If transverse shocks occur, the entire axle aggregate, consisting of the supporting member $g$, the driving aggregate $i$, $k$, $l$, the half axles $n$, the wheels $m$ and the spring $o$ may yield in lateral direction relatively to the frame in accordance with the rotary elasticity of the rubber buffers $c$.

The invention, however, is not limited to a resiliency of the axle aggregate effected in such a manner.

In the section shown in Fig. 4 it has been supposed that the support consists not of tubes but of two sheet metal plates $r$, $s$, having as mentioned above bulgings at their margins which may be arranged in form of tubes corresponding to the tubes $e$, $f$, $g$, $h$.

In Figs. 5 and 6 another construction, similar to that shown in Fig. 4, is illustrated, whereby, due to the arrangement of the tube frame shown in Fig. 5, a rectilinear lateral displacement of the axle aggregate relatively to the frame or body of the vehicle is obtained. In this case the frame of the vehicle is constructed as shown in Fig. 6 and at each side terminates in a forked end $p$, $q$. The rear end shows two openings into which the pivots of the supporting frame, constituting of two horizontal tubes $e$, $f$ and two vertical tubes $t$, may be inserted. Mounted upon and vulcanized to the pivots of the supporting frame are rubber sleeves $u$. The outer surfaces of the rubber sleeves $u$ also are connected by vulcanization to the interior walls of the openings in the forked ends of the frame of the vehicle. In this manner the entire axle aggregate is rendered laterally displaceably. For the sake of clearness the axle aggregate has been omitted in Fig. 5 and in Fig. 6 the frame only is shown to clearly illustrate the connection of the supporting frame to the frame of the vehicle.

Having now particularly described and ascertained the nature of our said invention and in what manner the same is to be performed we declare that what we claim is:

1. In a vehicle having a main frame, a subsidiary substantially rectangular frame, including upper and lower transverse tubular sections, positioned in a substantially vertical transverse plane, means yieldably connecting said subsidiary frame to said main frame for movement transversely of said main frame, and a vehicle driving unit, including drive gears and driven wheels, connected to and movable with said subsidiary frame.

2. In a vehicle having a main frame, a subsidiary substantially rectangular frame positioned in a substantially vertical transverse plane, means yieldably connecting the opposite outer sides of said subsidiary frame to said main frame for movement transversely of said main frame, and a vehicle driving unit, including drive gears and driven wheels, connected to and movable with said subsidiary frame.

3. The combination according to claim 2, in which said driving unit includes the vehicle engine.

4. The combination according to claim 2, in which said driving unit includes the vehicle engine and the speed-change gear, the engine being connected to said subsidiary frame at its forward end and extending rearwardly thereof, the drive gears being positioned forwardly of said subsidiary frame, and the change speed gears forwardly of said drive gears.

5. The combination according to claim 2, in which the means connecting the subsidiary frame to the main frame includes rubber bushings.

6. The combination according to claim 2, in combination with swinging half-axles supporting said wheels on said driving unit, and spring means intermediate said swinging half-axle and said driving unit.

7. The combination according to claim 2, in combination with swinging half-axles supporting said wheels on said driving unit, and a transverse leaf spring connected at its center to said driving unit and at its end to said swinging half axle.

8. In a vehicle having a main frame, a driving unit for said vehicle, including drive gears and driven wheels, two pairs of hollow vertical pivot blocks, one pair connected to said main frame and the other to said driving unit, a pair of links, each link having the form of an inverted U, means pivotally mounting the legs of said links in said pivot block with the tops of said links extending in a generally longitudinal direction, so that said links form a parallelogram with said main frame and driving unit, whereby said main frame and driving unit can move relatively to one another transversely of said vehicle, and means in at least some of said pivot blocks, intermediate the latter and the respective link legs for yieldably resisting pivotal movement of said legs in said pivot blocks and thereby resisting relative transverse motion of said main frame and driving unit.

9. The combination according to claim 8, in which said yieldable means comprises a hollow rubber bushing in said pivot blocks attached on the outside to said pivot blocks and on the inside to the legs of said links.

10. In a vehicle having a main frame, a subsidiary substantially rectangular frame positioned in a substantially vertical transverse plane and including a vertical hollow tubular member on each side of the subsidiary frame, a pair of links having a substantially longitudinally directed portion pivotally connected about a vertical axis to the main frame at one end and having a depending leg on its other end pivotally mounted in one of the vertical tubular member of the subsidiary frame, whereby said links form a parallelogram with said main and subsidiary frames so that said frames can swing transversely of one another, means for yieldably resisting said transverse swinging, and a driving unit for said vehicle including drive and driven wheels, attached to said subsidiary frame.

11. The combination according to claim 10, in which said yieldable means comprises hollow rubber bushings attached on the outside within said vertical tubular members and on the inside to the depending legs of said links.

12. The combination according to claim 10, in which said subsidiary frame includes hollow transverse tubular sections interconnecting said vertical tubular members.

13. The combination according to claim 10, in which said driving unit includes the vehicle engine.

14. The combination according to claim 1, in which said subsidiary frame includes vertical tubular members interconnecting the outer ends of said transverse tubular members.

15. The combination according to claim 10, in which said subsidiary frame includes a pair of transverse sheet metal plates attached face to face and extending between said vertical tubular members, said sheets being formed with cooperating substantially semi-circular oppositely positioned troughs along their upper and lower edges forming together hollow transverse tubular strengthening beams.

16. The combination according to claim 1, in which said main frame is formed with a pair of vertical forked rearward extensions, and said yieldable means comprise rubber bushings mounted in said forks and about the ends of said transverse tubular sections.

BÉLA BARÉNYI.
KARL WILFERT.